(12) United States Patent
Jovenall

(10) Patent No.: US 10,643,500 B2
(45) Date of Patent: May 5, 2020

(54) COMPUTERIZED RAILROAD TRACK MAPPING METHODS AND SYSTEMS

(71) Applicant: LAIRD TECHNOLOGIES, INC., Earth City, MO (US)

(72) Inventor: Jeremy Jovenall, Mercer, PA (US)

(73) Assignee: Cattron North America, Inc., Warren, OH (US)

( * ) Notice: Subject to any disclaimer, the term of this patent is extended or adjusted under 35 U.S.C. 154(b) by 294 days.

(21) Appl. No.: 15/851,256

(22) Filed: Dec. 21, 2017

(65) Prior Publication Data

US 2019/0197923 A1 Jun. 27, 2019

(51) Int. Cl.
| | |
|---|---|
| *G09B 29/00* | (2006.01) |
| *B61L 25/02* | (2006.01) |
| *B61L 27/00* | (2006.01) |
| *G01P 15/00* | (2006.01) |
| *B61L 23/04* | (2006.01) |

(52) U.S. Cl.
CPC .......... *G09B 29/007* (2013.01); *B61L 25/025* (2013.01); *B61L 25/028* (2013.01); *B61L 27/0077* (2013.01); *B61L 23/04* (2013.01); *G01P 15/003* (2013.01)

(58) Field of Classification Search
CPC . G09B 29/007; B61L 27/0077; B61L 25/025; B61L 25/028; B61L 23/04; G01P 15/003
See application file for complete search history.

(56) References Cited

U.S. PATENT DOCUMENTS

| | | | | |
|---|---|---|---|---|
| 9,688,297 | B2 * | 6/2017 | Ryan | B61L 29/24 |
| 10,145,690 | B2 * | 12/2018 | Koshiba | G01C 21/20 |
| 2007/0150130 | A1 * | 6/2007 | Welles | B61L 17/00 |
| | | | | 701/19 |
| 2008/0054072 | A1 | 3/2008 | Katragadda et al. | |
| 2010/0226551 | A1 | 9/2010 | Shi et al. | |
| 2012/0203402 | A1 * | 8/2012 | Jape | B61L 23/047 |
| | | | | 701/19 |
| 2016/0221592 | A1 | 8/2016 | Puttagunta et al. | |
| 2017/0126810 | A1 | 5/2017 | Kentley et al. | |
| 2019/0197923 | A1 * | 6/2019 | Jovenall | G09B 29/007 |

OTHER PUBLICATIONS

Jaffe, Eric; Watch Amtrack Trains Move along their Routes in Real Time; Oct. 2. 2013, citylab.com; 4 pages.
International Search Report and Written Opinion for PCT Application No. PCT/US2018/056659 filed Oct. 19, 2018, dated Feb. 12, 2019, 13 pages.

* cited by examiner

*Primary Examiner* — Russell Frejd
(74) *Attorney, Agent, or Firm* — Harness, Dickey & Pierce, P.L.C.; Anthony G. Fussner

(57) ABSTRACT

A system includes at least one train having one or more sensors and a device remote from the at least one train. The device is configured to communicate with the at least one train via one or more networks, collect data from the one or more sensors of the at least one train at a plurality of different locations in a defined area, and generate a map of the one or more tracks based on the data collected from the one or more sensors of the at least one train at the plurality of different locations in the defined area. Other example systems and computer-implemented methods of mapping one or more railroad tracks in a defined area are also disclosed.

20 Claims, 4 Drawing Sheets

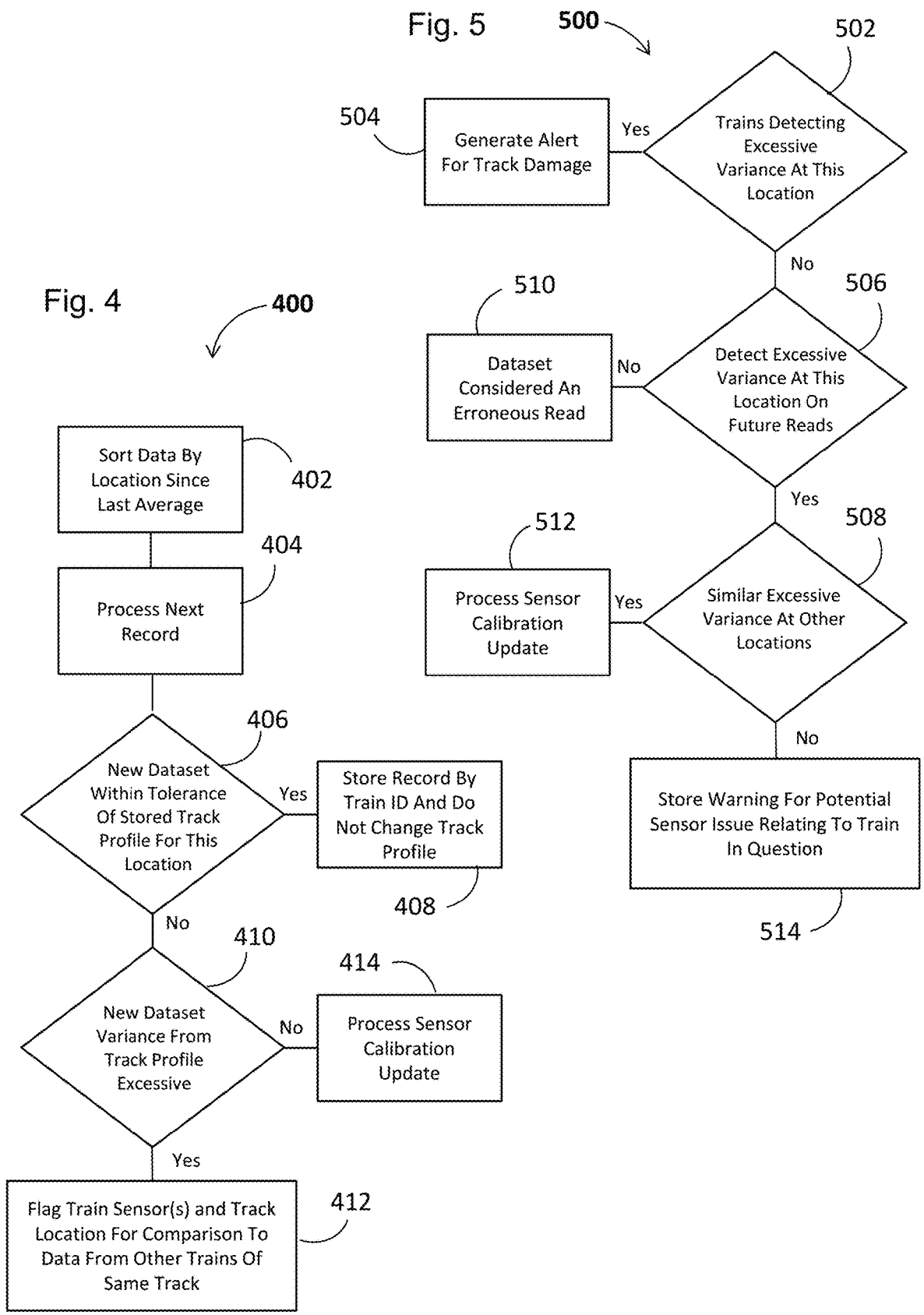

COMPUTERIZED RAILROAD TRACK MAPPING METHODS AND SYSTEMS

FIELD

The present disclosure relates to computerized railroad track mapping methods and systems.

BACKGROUND

This section provides background information related to the present disclosure which is not necessarily prior art.

Trains are commonly used to transport passengers, goods, and/or materials on railroad tracks. The trains include one or more railroad cars for carrying the passengers, goods, and/or materials, and one or more locomotives for pushing and/or pulling the railroad cars. Sometimes one or more maps of the railroad tracks are generated by a land surveyor calculating three-dimensional points on the railroad tracks and the distances and angles between the points.

DRAWINGS

The drawings described herein are for illustrative purposes only of selected embodiments and not all possible implementations, and are not intended to limit the scope of the present disclosure.

FIG. 4 is a flow chart of a method for processing data received from one or more sensors according to another example embodiment.

FIG. 5 is a flow chart of a method for generating one or more alarms according to yet another example embodiment.

DETAILED DESCRIPTION

Example embodiments will now be described more fully with reference to the accompanying drawings.

As recognized by the subject inventor, the industrial Internet of Things (IIoT) is rapidly expanding through the railroad industry. For example, trains including their locomotives are commonly equipped with various sensors and wireless connectivity points to allow for this growing automation trend. As further explained below, data may be collected from these various sensors and used to generate and/or update maps including rail environments and/or track conditions. This mapping of the rail environments and track conditions may ensure passenger, cargo, bystander, etc. safety.

Additionally, the collected sensor data may be used to detect track malfunctions (e.g., wear, degradation, catastrophic failure, etc.) in particular locations that may not otherwise be detectable. For example, as more trains travel over the same railroad track, that track may begin to sink into the ground over time due to the weight of the trains. This malfunction may be detected by the collected sensor data and reported if desired, as further explained below.

Further, the generated maps, collected data, etc. may be used by an automated control in a locomotive for controlling braking, acceleration, etc. and/or to improve map accuracy as compared to conventional systems. For instance, the collected sensor data may provide backup and/or verification data to cross check track profile maps used in existing automated systems.

Figure 1:
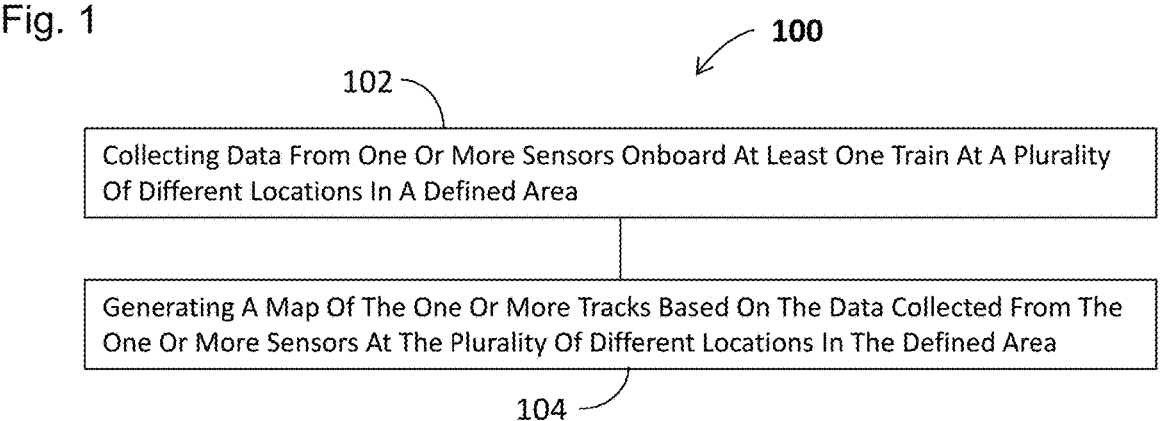
FIG. 1 is a flow chart of a method for mapping one or more railroad tracks according to one example embodiment of the present disclosure.

For example, a computer-implemented method of mapping one or more railroad tracks in a defined area according to one example embodiment of the present disclosure is illustrated in FIG. 1 and indicated generally by reference number 100. As shown in FIG. 1, the method 100 includes collecting data from one or more sensors onboard (e.g., inside, etc.) at least one train at a plurality of different locations in a defined area in block 102, and generating a map of the one or more tracks based on the data collected from the one or more sensors at the plurality of different locations in the defined area in block 104.

The data may be collected from sensors in or onboard a single train, and the maps may be generated based on that data. In other example embodiments, data may be collected from sensors in or onboard multiple trains at different locations in the defined area, and the maps may be generated based on that data. As further explained below, data may be collected from two trains (e.g., locomotives), five trains, 100 trains, 1,000 trains, and/or any other suitable number of trains.

In some embodiments, multiple datasets may be collected from a single train traveling over the same route on multiple occasions. If desired, the datasets may be compared to each other to ensure the data is valid. In other examples, multiple datasets may be collected from different trains as explained above. In such examples, the datasets from the different trains traveling over the same route may be compared to each other to ensure the data is valid. In either case, if the data is valid, the maps may be generated (and/or updated) based on the valid data and location data from the train(s). In some examples, data from the multiple datasets may be averaged together and then the maps may be generated (and/or updated) based on the averaged data and location data from the train(s).

Once generated and/or updated, the maps may be used to control one or more trains. For example, control units in or onboard the trains may store the maps for automated control, an engineer may use the maps when controlling a train, etc.

In some examples, the comparison may indicate the data is not validated (e.g., invalid data). In such examples, the sensors may be calibrated (and/or recalibrated), as further explained below. In other examples, an alarm may be generated when a comparison between the datasets indicates a variation greater than a defined threshold as further explained below. For example, if the variation in a new dataset (and/or subsequent collected datasets) is larger than a defined threshold, an alarm indicating track damage, inspection required, etc. may be generated. As further explained below, this alarm may be sent to appropriate personnel (e.g., via text messaging, emails, push alerts, etc.), main control boards, etc. In other examples, the sensors may be calibrated (and/or recalibrated) if the data is invalid.

The defined area in which data is collected may include one or more railways between two points. For example, the defined area may include a specific line between two cities, two railroad stops, two railroad crossings, etc. In other embodiments, the defined area may include one or more railways in a switchyard (e.g., railroad yard) where railroad cars are stored, loaded and switched to different tracks with one or more locomotives. The sensor data may be collected while the trains are moving and/or stationary in the defined area.

Figure 2:
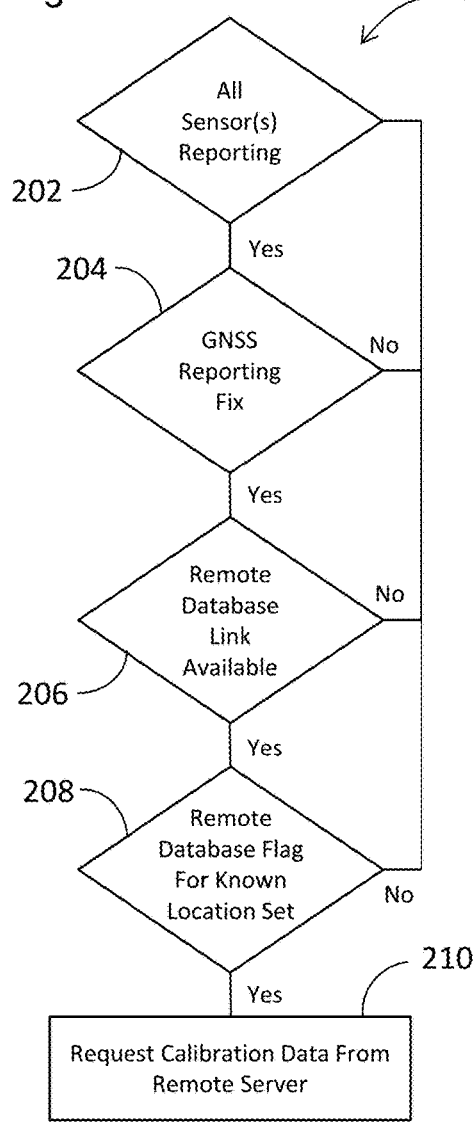
FIG. 2 is a flow chart of a method for initially calibrating sensors on a train according to another example embodiment.

The one or more sensors onboard the trains may be calibrated before collecting data. This initial calibration process may be performed by a computer server (broadly, a device) in communication with the trains and/or by a control unit on the trains. For example, FIG. 2 illustrates an initial calibration process 200 including multiple steps for calibrating sensors on a train. As shown in FIG. 2, the process 200 includes determining whether all of the sensors on the train are reporting (e.g., communicating with the computer server remote from the train, the train's control unit, etc.) in block 202. If so, the computer server and/or train's control unit determines if a global navigation satellite system (GNSS) on the train is reporting a fix in block 204. For example, the computer server and/or train's control unit determines whether the train's GNSS is attempting to obtain more precise location data, or if the location data is accurate enough to report (e.g., within a precision threshold). For instance, GNSS data may include an indication in a message (e.g., a serial message) that describes the quality of received satellite signals. In other words, this indication describes the precision of the received positional data. Different levels of precision could be required depending on the situation. In some examples, if National Marine Electronics Association (NMEA) standards are employed, the Horizontal Dilution of Precision (HDOP) field, the 'Fix Quality' field, and/or the 'Number of Satellites Being Tracked' field may be used.

If the train's GNSS is attempting to obtain more precise location data, the process 200 returns to block 202 and determines whether all of the sensors are reporting. However, if the location data from the GNSS is within the precision threshold, the computer server and/or train's control unit determines whether a remote database in (or in communication with) the computer server has a link available for communication in block 206. If not, the process 200 may return to determining whether the sensor(s) are reporting in block 202, or determining whether the train's GNSS is reporting a fix in block 204.

If a link is available for communication, the process 200 then determines whether a remote database flag for a known location set is available in block 208. For example, the database may include a dataset from another or the same train at the same location (but at a different time). In such examples, the previously stored data may be used to calibrate the train's sensors. As such, if the remote database flag for the particular location set is available, the control unit may request this data from the computer server to calibrate the train's sensors in block 210. In other examples, the computer server may send this calibration data to the train's sensors without a request. If, however, the remote database flag for the particular location set is not available, the process 200 may return to determining whether the sensor(s) are reporting in block 202, determining whether the train's GNSS is reporting a fix in block 204, or determining whether a remote database in (or in communication with) the computer server has a link available for communication in block 206.

Figure 3:
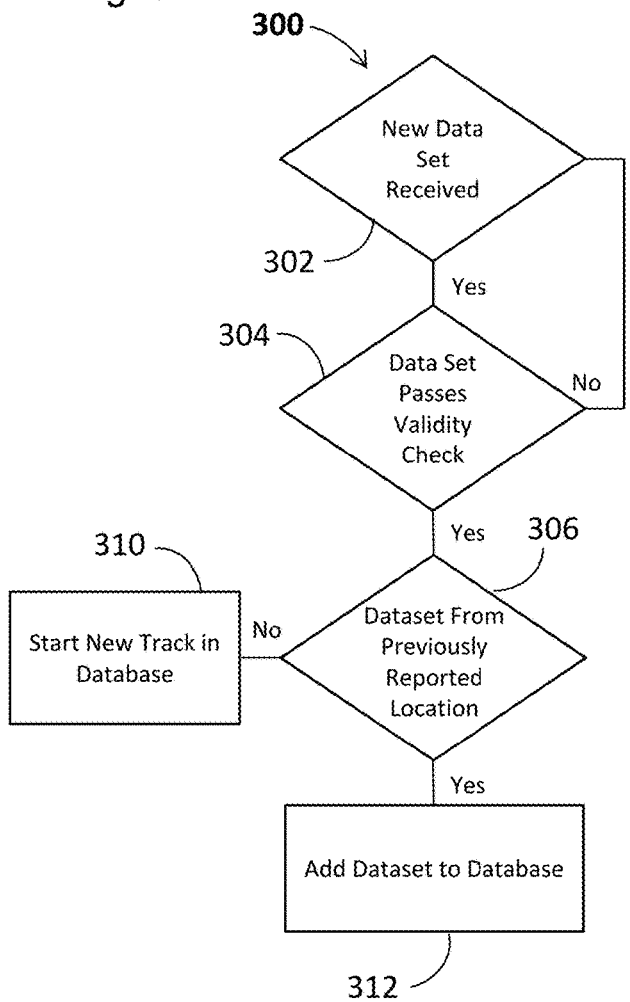
FIG. 3 is a flow chart of a method for collecting and storing data for generating and/or updating a map according to yet another example embodiment.

In some examples, the datasets received from the sensor(s) from one or more trains may be used to generate a new map of a track layout of the defined area, and/or update an existing map of the defined area. For example, FIG. 3 illustrates a process 300 including multiple steps for collecting and storing data for generating and/or updating a map. As shown in FIG. 3, the process 300 includes determining whether a new dataset has been received by the computer server in block 302. If so, the computer server determines whether the new dataset from a particular train passes a validity check in block 304.

For example, one or more data points from the new dataset may be compared to other data points in the new dataset. In other words, the computer server may collect data from the train multiple times over a period of time, and then validate this data in the new dataset by comparing the data from the train over the period of time. For instance, two or more consecutive data points may be compared to each other to ensure the data points are valid. If one data point represents a 3% grade on a first point on the track and the next data point represents a 3.1% grade at a second point near the first point on the track, the dataset may be deemed valid. However, if one data point represents a 3% grade on the first point on the track and the next data point represents a 97% grade at the second point near the first point on the track, the dataset may be deemed invalid. Additionally and/or alternatively, and as explained above, the new dataset from the train may be compared to other datasets obtained from the same train on the same rail path at different times and/or other datasets obtained from other trains on the same rail path at different times to determine if the new dataset is valid.

If the data from the new dataset is deemed invalid in block 304, the computer server returns to determining whether a new dataset has been received in block 302. If, however, the data from the new dataset is deemed valid in block 304, the computer server determines whether the new dataset includes data from a previously reported location in block 306. If no other data was reported for that particular location, the dataset is saved in the database and a new track map may be generated based on the new dataset in block 310.

If, however, the new dataset corresponds to a previously reported location, the data (e.g., location data, grade data, etc.) from the new dataset is added (e.g., recorded) to the database in block 312. In such examples, the new data and the existing data may be averaged. In some examples, the new data and the existing data may be averaged with the difference between new data and old data trended for further analysis if desired. The averaged the new data and the existing data may then be used to update an existing map (if necessary) as explained herein. As such, the computer server may generate a map based on data collected in one period of time, and then update the existing map based on the new data collected after the initial map was generated (e.g., in a later period of time).

FIG. 4 illustrates a process 400 including multiple steps for processing data received from the sensors. As shown in FIG. 4, the process 400 includes sorting data stored in the computer server's database by location (e.g., the GNSS location) since the last averaging of this data in block 402, and then processing the sorted data (e.g., a next record) in block 404. The computer server then determines whether the data in the new dataset collected from the sensors is within a defined tolerance of a stored track profile corresponding to the same location in block 406. For example, the defined tolerance may be determined based on existing datasets from the same track and location (e.g., benchmark data). This defined tolerance may be continually updated based on received data. In some examples, different tolerances may be employed at different steps in the mapping process. For example, an initial collection of data may have a wider tolerance than a later collection of data. This wider tolerance allows the server to capture and use a larger amount data in the early stages of the track data average. Later collection(s) of data may have a decreased tolerance so that a change in data and/or trends in detected changes would be noticeable.

If the data is within the defined tolerance, the data from the dataset is recorded (e.g., stored) in the database by a train identification number (e.g., train 1234) in block 408. During this time, the track profile in the database for generating and/or updating the map is not changed.

If, however, the data is not within the defined tolerance in block 406, the computer server determines whether the variance from the stored track profile is deemed excessive in block 410. For example, the new dataset may be compared to other existing datasets from the same track and location (e.g., benchmark data) to determine whether a variation is greater than a defined threshold to determine if the variance is excessive. Similar to the defined tolerance explained above, the variance may be continually updated based on received data. In some examples, one variance may be employed at one point in the mapping process, and another variance may be employed at another point in the mapping process. For example, an initial collection of data may have a wider variance than a later collection of data. This wider variance allows the server to capture and use a larger amount data in the early stages of the track data average. Later collection(s) of data may have a decreased variance so that a change in data and/or trends in detected changes would be noticeable.

If the variance is not deemed excessive (but is outside the defined tolerance in block 406), the computer server may process a sensor calibration update for the sensors of the particular train in block 414. This sensor calibration update may be sent to the particular train to recalibrate its sensors. If the variance is deemed excessive in block 410, the computer server may flag the train's sensors and track location for comparison to data from other trains of the same track and location in block 412.

In some example embodiments, when data variance from one or more trains is excessive, an alarm may be generated. For example, FIG. 5 illustrates a process 500 including multiple steps for processing flags (e.g. the flags set in the process 400 of FIG. 4). As shown in FIG. 5, the process 500 begins by detecting whether data from other trains had an excessive variable at a particular location in block 502. For instance, once the flag is set in block 412 of FIG. 4, the computer server may continue collecting data on other (and/or the same) train on the same track and at the same location. If the variance in the collected data from the other trains and/or the same train is also excessive (e.g., as determined in block 410 of FIG. 4), an alarm may be generated to report track damage in block 504. This alarm may indicate the severity of the damage, the location of the damage, action items required, etc. The alarm may be sent to appropriate personnel (e.g., via text messaging, emails, push alerts, etc.), main control boards, etc.

If the variance in the collected data from the other trains and/or the same train is not excessive, the computer server may continue to monitor new datasets corresponding to the location in question. Specifically, the computer server may detect whether the same train or other trains report datasets having an excessive variance at this same location in block 506. If the computer server does not detect another dataset having an excessive variance at this same location, the new dataset flagged as excessive in block 412 of FIG. 4 may be considered an erroneous read in block 510 of FIG. 5. The computer server may continue to monitor datasets at this same location continually, for a defined period of time, for a defined number of datasets, etc. If the new dataset is considered erroneous, the dataset may be disregarded.

If, however, the computer server does detect another dataset having an excessive variance at the same location in block 506, the computer server may determine whether the particular train provides similar excessive variances at other locations on the track in block 508. In some specific embodiments, the computer server may determine whether the particular train provides data of similar directional excessive variances at other locations (e.g., in the x-direction, y-direction, and/or z-direction). This may indicate a calibration issue with sensors on that particular train.

If so, the computer server may process a sensor calibration update for the sensors of the particular train in block 512 (and as explained above relative to block 414 of FIG. 4). If the computer server determines the train does not provide similar excessive variances at other locations on the track in block 508, the computer server may store the data and a warning for potential sensor issues relating to this particular train in block 514.

Any one or more of the methods disclosed herein may be implemented by one or more computer servers. For example, the computer servers may include memory for storing computer-readable instructions for performing the methods described above and one or more processors for executing the computer-readable instructions. Additionally and/or alternatively, the computer-readable instructions for performing the methods may be stored on a non-transitory computer-readable medium including, for example, disks, SD cards, DVD, CD-ROMs, ROMs, RAMs, EPROMs, EEPROMs, DRAMs, VRAMs, flash memory devices, or any other suitable medium for storing instructions. In some examples, the memory and/or the non-transitory computer-readable medium may include one or more databases to store data collected from the sensors as explained herein.

Figure 6:
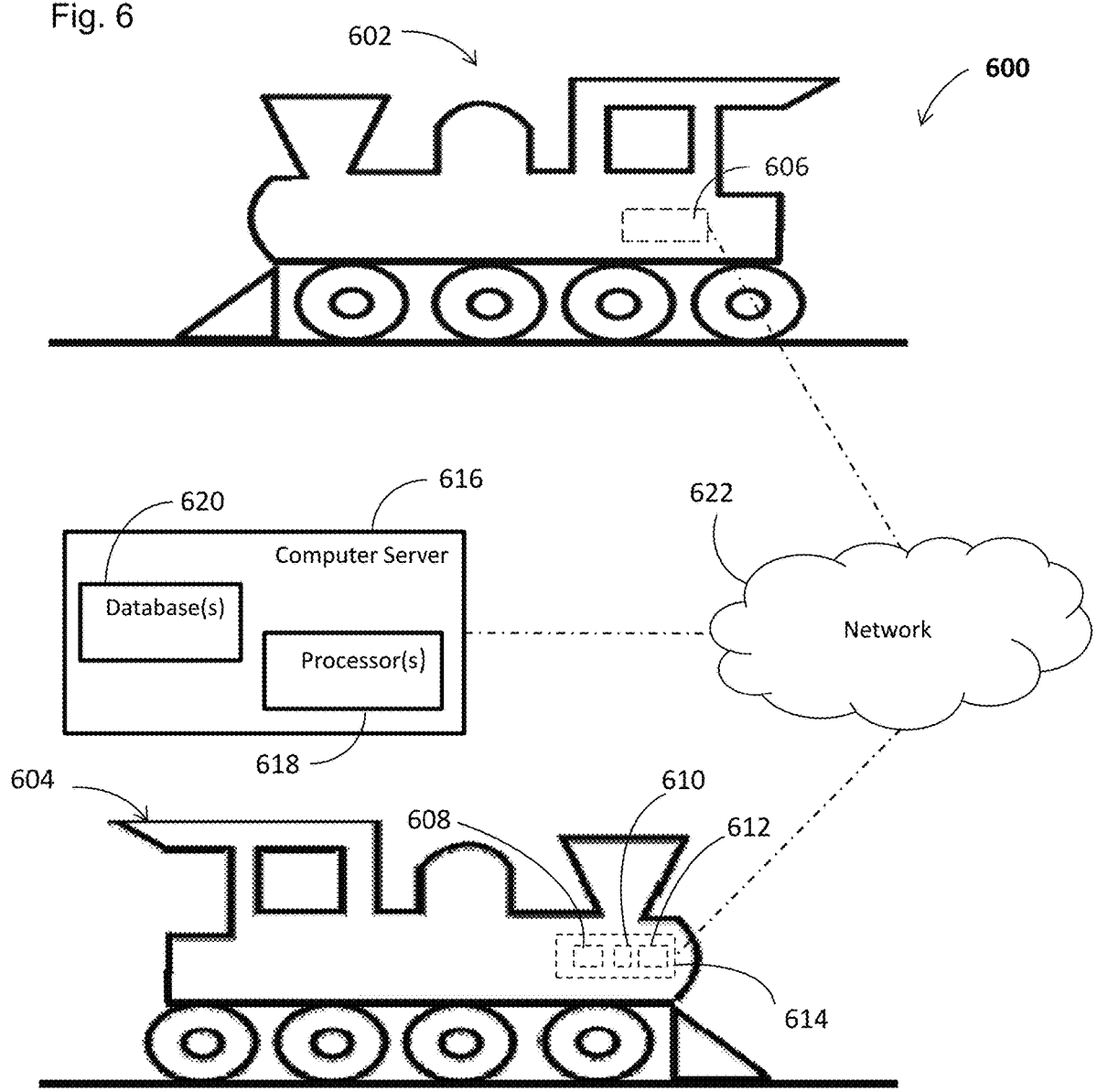
FIG. 6 is a diagram of a system including two trains and a remote computer server in communication with the trains via a wireless network according to another example embodiment.

For example, FIG. 6 illustrates a system 600 including two trains (e.g., locomotives) 602, 604 having sensors 606, 608, 610, 612 and a computer server 616 remote from the trains 602, 604. The computer server 616 communicates (represented by dashed lines) with the trains 602, 604 via a network 622. Although the system 600 includes two trains 602, 604, it should be apparent to those skilled in the art that more or less trains may be in communication with the computer server 616.

The network 622 is a wireless network over which the computer server 616 wirelessly communicates with the train 602, 604. The wireless network 622 may be a Wi-Fi network, a cellular based network, Bluetooth, and/or any other suitable wireless network depending on, for example, the distance between the computer server 616 and the trains 602, 604. In some examples, wireless repeaters and/or extenders may be employed if necessary. This wireless capability allows for greater flexibility in placement of the computer server 616. For example, the computer server 616 may be located in a switchyard and/or at another suitable location outside the switchyard. Additionally and/or alternatively, the computer server 616 may communicate with the network 622 (and/or another network) with a wired connection.

The computer server 616 includes one or more databases 620 for storing data from the sensors 606, 608, 610, 612 and one or more processors 618 for implementing instructions for performing the methods described above. For example, the computer server 616 may include instructions to cause the server to collect data from the sensors 606, 608, 610, 612 of the trains 602, 604 at different locations in a defined area, and generate maps of tracks in the defined area based on the data collected from the sensors 606, 608, 610, 612, as explained above.

In the particular example of FIG. 6, the databases 620 are a part of the computer server 616. For example, the computer server's memory (not shown) may include the databases 620. In other examples, the databases 620 and/or one or more other databases may be external to the computer server 616.

As shown, the trains 602, 604 are located on train tracks. The trains 602, 604 may be stationary and/or moving when the computer server 616 collects data from the sensors 606, 608, 610, 612. For example, the train 602 and/or the train 604 may be moving and/or stationary in a switchyard. Additionally and/or alternatively, one or both trains 602, 604 may be moving and/or stationary on a particular railroad track outside the switchyard. For example, one or both trains 602, 604 may be traveling between two cities, two switchyards, etc.

In the particular example of FIG. 6, the train 602 includes the sensor 606, and the train 604 includes the sensors 608, 610, 612. The sensors 606, 608, 610, 612 may be located at any suitable location onboard (e.g., inside, outside, on, in, etc.) the trains 602, 604 including, for example, inside a cab of the trains 602, 604, on an exterior surface of the trains 602, 604, etc. In some embodiments, the sensors 606, 608, 610, 612 may be located adjacent (and in communication with) a control unit or within a control unit of one or both trains 602, 604. For example, and as shown in FIG. 6, the train 604 includes a control unit 614 including the sensors 608, 610, 612. In such examples, the control unit 614 may collect data from the sensors 608, 610, 612, and then pass that data along to the computer server 616 via the wireless network 622.

In some embodiments, the control unit 614 may filter data collected from the sensors 608, 610, 612. For example, the control unit 614 may compare data from each of the sensors 608, 610, 612 over a period of time. For instance, two or more consecutive data points may be compared to each other from the sensor 608 to ensure the data points are valid as explained above. If the data is deemed invalid, the control unit 614 may filter that data (e.g., prevent the data from passing to the computer server 616). If the data is deemed valid, the control unit 614 may allow the data to pass to the computer server 616.

In other examples, the sensors may directly communicate with the computer server 616. For example, and as shown in FIG. 6, the sensor 606 on the train 602 may directly communicate with the computer server 616 via the wireless network 622.

The sensor data from the sensors 606, 608, 610, 612 may be provided to the computer server 616 continuously, periodically, randomly, and/or in response to a defined event. For example, the sensor 606 and/or the control unit 614 may push sensor data to the computer server 616 periodically (e.g., twice a day, at predetermined time intervals, etc.), the computer server 616 may pull data from the control unit 614 and/or the sensor 606 continuously, etc.

The sensors 606, 608, 610, 612 (and/or any other sensor disclosed herein) may be any suitable sensor. In some examples, each of the sensors 606, 608, 610, 612 may be or at least part of a kinematic sensor for sensing a rate of change (e.g., acceleration) in a three dimensional space. For example, the kinematic sensor may assist in determining a change in grade along a track based on gravity. In the specific example of FIG. 6, the sensors 608, 610, 612 on the train 604 represent a magnetometer, an accelerometer, and a gyroscope, respectively, of a kinematic sensor.

As explained above, one or more maps (e.g., virtual maps) may be generated and/or updated based on the collected data from the sensors 606, 608, 610, 612. For example, the maps may be created and/or updated based on kinematic sensor data and GNSS data provided by the trains 602, 604. As such, the computer server 616 may determine particular track layouts, elevation grades, severity of curves, etc. at particular points along a track based on the kinematic sensor data and the GNSS data.

Figure 7:
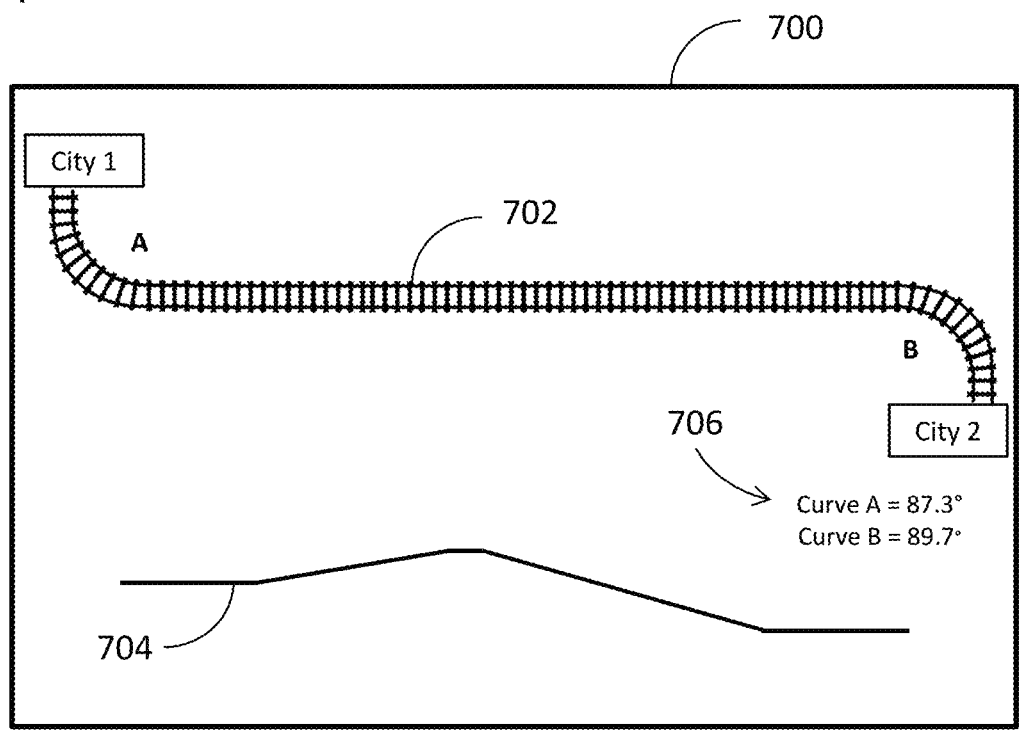
FIG. 7 is a diagram of a generated map illustrating a track between two cities, elevation grades of the track and angles in the track according to yet another example embodiment.
Figure 8:
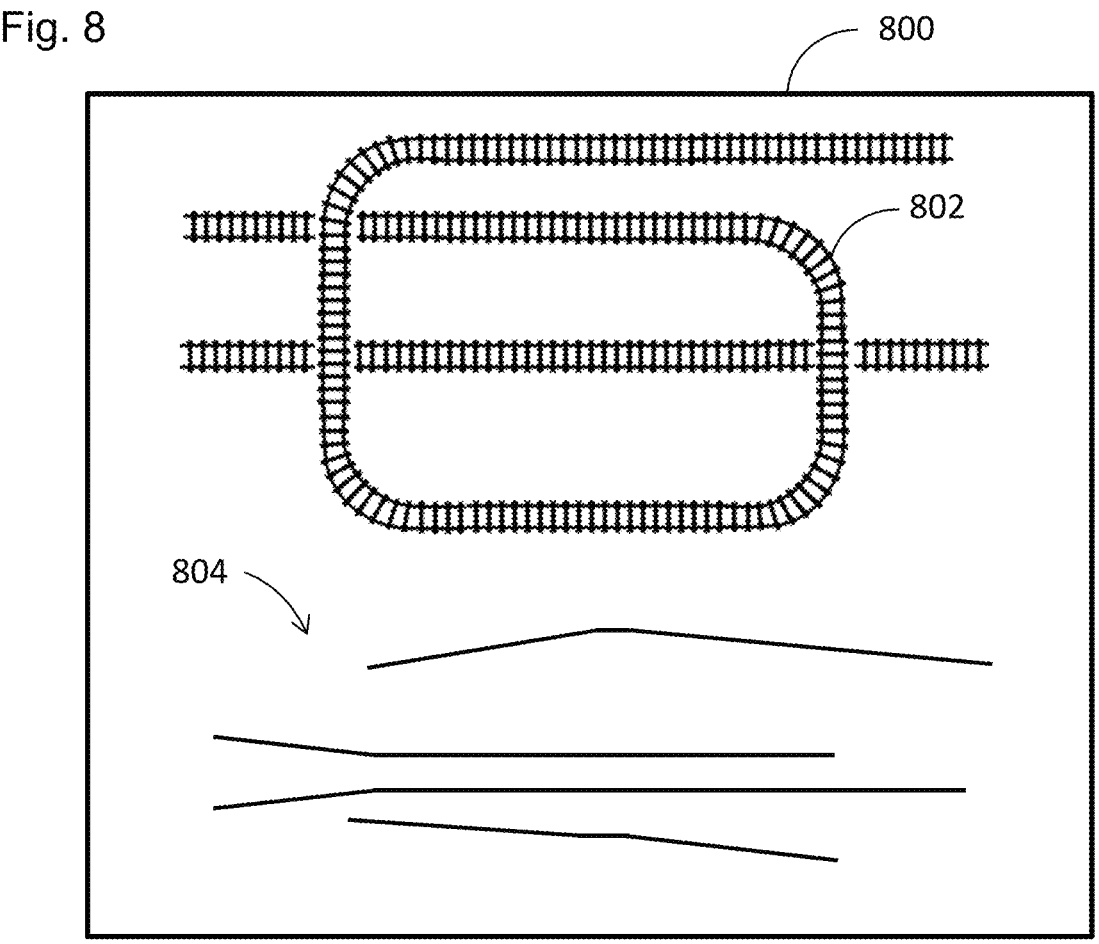
FIG. 8 is a diagram of a generated map illustrating multiple tracks in a switchyard and elevation grades of the tracks according to another example embodiment.

FIGS. 7 and 8 illustrate example maps 700, 800, respectively. As shown in FIG. 7, the map 700 includes a track layout 702 between two cities (City 1 and City 2), a line 704 representing elevation grades along a portion of the track, and a legend 706 indicating the severity of the curves (curve A and curve B) in the track. By way of example, the grade of the track is substantially constant near City 1, increases substantially linearly, is substantially constant at about the midpoint between City 1 and City 2, decreases substantially linearly, and is substantially constant near City 2. As shown in FIG. 7, curve A is about 87.3° and curve B is about 89.7°.

The map 800 of FIG. 8 includes a track layout 802 having multiple tracks inside a switchyard, and lines 804 representing elevation grades along different portions of the track. Specifically, the lines 804 represent the horizontal portions of the track shown in FIG. 8. For example, the top grade line represents the top most horizontal portion of the track, the bottom grade line represents the bottom most horizontal portion of the track, and the two middle grade lines represent the middle horizontal portions of the track.

In an exemplary embodiment, a system generally includes a non-transitory computer-readable storage media including computer-executable instructions for mapping one or more railroad tracks in a defined area, which when executed by at least one processor, cause the at least one processor to: collect data from one or more sensors onboard at least one train at a plurality of different locations in the defined area; and generate a map of the one or more tracks based on the data collected from the one or more sensors at the plurality of different locations in the defined area.

In an exemplary embodiment, one or more devices onboard a train (e.g., a locomotive) are configured to be operable for sensing track layout and conditions through the use of sensors. such as redundant kinematic sensing arrays). Track data may be recorded along with corresponding positioning data from a global navigation satellite system and/or from other methods or means. This data may be collected at a remote location. At the remote location, data may also be collected from more than one of such systems. A map may be created from the collected data that defines track layout, grade, and other pertinent data points. Through the comparison of multiple sensor reads over multiple systems, a model may be built of the track profile. Additionally, a feedback loop may be created to detect system sensor deviation from the average values in order to compensate for minor differences in the sensor mounting, e.g., device calibration. The data may be used for various reasons, such as one or more of the following: preparation for locomotive automation systems that require detailed track profile information, backup/verification data to cross check provided track profile maps used in existing automation systems, detection of locations of wear or degradation in the roadbed, and/or detection of a catastrophic failure of track or roadbed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

It should be appreciated that one or more aspects of the present disclosure transform a general-purpose computing device into a special-purpose computing device when configured to perform the functions, methods, and/or processes described herein. None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   one or more sensors positionable onboard each of a plurality of trains; and
   a device positionable remote from the plurality of trains, the device configured to communicate with the plurality of trains via one or more networks, collect data from the one or more sensors at a plurality of different locations in a defined area, compare the data collected from the one or more sensors of one of the plurality of trains with the data collected from the one or more sensors of one or more other trains of the plurality of trains, and generate or update a map of one or more tracks based on the data from the one or more sensors of said one of the plurality of trains if the comparison indicates a variation less than a defined threshold between the data collected from said one of the plurality of trains and said one or more other trains of the plurality of trains.

2. The system of claim 1, wherein the device comprises a computer server.

3. The system of claim 1, wherein the device is configured to average the data collected from the one or more sensors and generate or update the map based on the average of the data collected.

4. The system of claim 1, wherein the device is configured to collect data from the one or more sensors over a period of time, generate the map based on the data collected in a first portion of the period of time, and update the map based on the data collected in a second portion of the period of time.

5. The system of claim 1, wherein the device is configured to generate an alarm when the comparison indicates a variation greater than the defined threshold between the data collected from said one of the plurality of trains and said one or more other trains of the plurality of trains.

6. The system of claim 5, wherein the device is configured to collect data from at least one of the plurality of trains a plurality of times over a period of time, validate the data by comparing the data from the at least one of the plurality of trains over the period of time, and provide one or more signals to the at least one of the plurality of trains to calibrate the one or more sensors if the data collected is not validated.

7. The system of claim 1, wherein the device is configured to collect data from the one or more sensors onboard at least one of the plurality of trains a plurality of times over a period of time and validate the data by comparing the data from the one or more sensors onboard the at least one of the plurality of trains over the period of time.

8. The system of claim 7, wherein the device is configured to provide one or more signals to the at least one of the plurality of trains to calibrate the one or more sensors if the data collected is not validated.

9. The system of claim 1, wherein the device is configured to collect data from the one or more sensors of the plurality of trains periodically or continuously.

10. The system of claim 1, further comprising at least one control unit onboard at least one of the plurality of trains the control unit configured to filter data collected from the one or more sensors.

11. The system of claim 1, wherein the one or more sensors includes at least one kinematic sensor.

12. The system of claim 1 wherein the map includes at least one of an elevation grade along the one or more tracks and an angle of a curve along the one or more tracks.

13. A computer-implemented method of mapping one or more railroad tracks in a defined area, the method comprising:
collecting data from one or more sensors onboard each of a plurality of trains at a plurality of different locations in the defined area;
comparing the data collected from the one or more sensors of one of the plurality of trains with the data collected from the one or more sensors of one or more other trains of the plurality of trains; and
generating or updating a map of the one or more railroad tracks based on the data collected from the one or more sensors of said one of the plurality of trains if the comparison indicates a variation less than a defined threshold between the data collected from said one of the plurality of trains and said one or more other trains of the plurality of trains.

14. The method of claim 13, further comprising averaging the data collected from the one or more sensors of the plurality of trains, and wherein generating or updating the map includes generating or updating the map based on the average of the data collected.

15. The method of claim 14, wherein collecting data includes collecting data from the plurality of trains over a period of time, and wherein generating the map includes generating the map based on the data collected in a first portion of the period of time, the method further comprising updating the map based on the data collected in a second portion of the period of time.

16. The method of claim 13, further comprising generating an alarm when the comparison indicates a variation greater than the defined threshold between the data collected from said one of the plurality of trains and said one or more other trains of the plurality of trains.

17. The method of claim 13, wherein collecting data includes collecting data from at least one of the plurality of trains over a period of time, the method further comprising comparing the data from the at least one of the plurality of trains over the period of time to validate the data.

18. The method of claim 17, further comprising providing one or more signals to the at least one of the plurality of trains to calibrate the one or more sensors if the data collected is not validated.

19. One or more computer servers having one or more processors configured to perform the method of claim 13.

20. A system comprising a non-transitory computer-readable storage media including computer-executable instructions for mapping one or more railroad tracks in a defined area, which when executed by at least one processor, cause the at least one processor to:
collect data from one or more sensors onboard each of a plurality of trains at a plurality of different locations in the defined area;
compare the data collected from the one or more sensors of one of the plurality of trains with the data collected from the one or more sensors of one or more other trains of the plurality of trains; and
generate or update a map of the one or more railroad tracks based on the data collected from the one or more sensors of said one of the plurality of trains if the comparison indicates a variation less than a defined threshold between the data collected from said one of the plurality of trains and said one or more other trains of the plurality of trains.

* * * * *